United States Patent [19]

Tsubouchi et al.

[11] Patent Number: 4,807,438

[45] Date of Patent: Feb. 28, 1989

[54] RESERVOIR INLET ASSEMBLY FOR A MASTER CYLINDER

[75] Inventors: Kaoru Tsubouchi, Toyota; Chiaki Ochiai, Chiryu, both of Japan

[73] Assignee: Aisin Seiki Kabushiki Kaisha, Kariya, Japan

[21] Appl. No.: 14,539

[22] Filed: Feb. 13, 1987

[30] Foreign Application Priority Data

Feb. 13, 1986 [JP] Japan .................................. 61-019740

[51] Int. Cl.⁴ ................................................. F15B 7/00
[52] U.S. Cl. ......................................... 60/585; 60/592
[58] Field of Search .......................... 60/562, 592, 585

[56] References Cited

U.S. PATENT DOCUMENTS

| | | | |
|---|---|---|---|
| 4,489,556 | 12/1984 | Komorizono et al. | 60/585 |
| 4,497,176 | 2/1985 | Rubin | 60/592 |
| 4,553,395 | 11/1985 | Price | 60/562 |
| 4,566,276 | 1/1986 | Komorizono | 60/592 |
| 4,615,175 | 10/1986 | Ishiwata | 60/562 |
| 4,621,498 | 11/1986 | Schaefer | 60/562 |
| 4,685,301 | 8/1987 | Bacardit | 60/562 |

Primary Examiner—Robert E. Garrett
Assistant Examiner—George Kapsalas
Attorney, Agent, or Firm—Burns, Doane, Swecker & Mathis

[57] ABSTRACT

An inlet assembly for a brake master cylinder includes an inlet member made of synthetic resin installed in the cylinder body of the master cylinder which has at least two inlet portions and one outlet portion positioned between the inlet portions at the same side. The master cylinder is connected through the inlet portion to a hose communicating with a reservoir installed in a vehicle body. The inlet member includes a first member integrally formed of a first tubular portion on a cylinder body side of the inlet member which is fitted into an inlet portion of cylinder body, a second tubular portion for operative engagement with the hose, and a second member having a mounting portion for mounting on the cylinder body by apparatus for positioning the inlet member on the cylinder body and an opening portion which is fitted by a boss portion surrounding the outlet portion of cylinder body.

3 Claims, 2 Drawing Sheets

RESERVOIR INLET ASSEMBLY FOR A MASTER CYLINDER

BACKGROUND OF THE INVENTION

1. Field of the Invention

This invention relates generally to a brake master cylinder and more particularly to an inlet assembly for a tandem brake master cylinder, the inlet member being installed in the body of the master cylinder for connecting the master cylinder with a hose which, in turn, is connected with the reservoir installed in a vehicle body.

2. Description of the Prior Art

In a conventional brake master cylinder of the foregoing type, an inlet member is formed by molding and is made of synthetic resin such as nylon, etc. in order to be both lighter in weight and lower in cost. An inlet member of this type is described, for example, in Japanese Utility Model Laid-Open No. 57-6661. In this publication, the inlet member includes two tubular hose members positioned in two inlet portions of the cylinder body for cooperation with a hose communicating with a reservoir respectively. The tubular hose member has a first tubular portion hermetically connected to the inlet portion of the cylinder body and a second tubular portion integrally formed on the first tubular portion by molding and hermetically connected to the hose communicating with the reservoir.

The tubular hose member is provided with a projection portion and a concave portion at an upper and side ends thereof, respectively. Also the inlet member includes the fixed member, which is provided with the fitting portion at both ends thereof engaged with the projection portion and the concave portion for restraining the revolution of the tubular hose member with regard to the cylinder body.

In the inlet member of the publication, however, there is a drawback that work performance in assembling or overhauling the brake master cylinder may be deteriorated, because it is necessary to engage the fitting portion of the fixed member with the projection portion and the concave portion of the tubular hose member after the tubular hose member is hermetically connected to the inlet portion of the cylinder body. Further, in the case of using a brake master cylinder which has a cylinder body provided with at least two inlet portions and one outlet portion positioned between the inlet portions at the same side, due to the position of the brake pressure pipe on the vehicle suffered by the space for layout, the inlet member of the prior art is more difficult to be installed on the cylinder body of a brake master cylinder of the above-described type.

SUMMARY OF THE INVENTION

It is therefore an object of the present invention to facilitate work on the assembly and overhaul of the brake master cylinder.

It is another object of the present invention to provide an inlet assembly comprising an inlet member which is easily installed on the cylinder body and is provided with at least two inlet portions and one outlet portion positioned between the inlets portions, and on the same side of the body as the inlets.

According to the present invention, the inlet member comprises two first members having a first tubular portion hermetically fitted into the inlet portion of the cylinder body and a second tubular portion hermetically connected to a hose, respectively, and a second member. The second member is provided with an opening portion fitted into a boss portion surrounding an outlet portion positioned between the inlet portions of the cylinder body.

In the present invention, it is possible to facilitate work on the assembly, overhaul of the brake master cylinder and to improve work performance in assembling and overhauling the brake master cylinder. The arrangement has the inlet member installed on the inlet portion of the cylinder body by the fitting of first tubular portion in the inlet portion of cylinder body. The arrangement permits restraining revolution or rotation of the first member with regard to the cylinder body as one of the first members restrains the revolution or rotation of the other first member due to the positioning of the inlet member on the inlet portion. In use of the brake master cylinder having a cylinder body provided with at least two inlet portions and one outlet portion positioned between the inlet portions on the same side of the cylinders due to the position of the brake pressure pipe on the vehicle suffered by the space for layout. Because of this engagement, it is possible to easily install the inlet member on the inlet portion of the cylinder body so that the second member may be provided with the opening portion fitted by the boss portion surrounding the outlet portion.

BRIEF DESCRIPTION OF THE DRAWINGS

Various other objects, features and attendant advantages of the present invention will be more fully appreciated as the same becomes better understood from the following detailed description when considered in connection with the accompanying drawings.

DETAILED DESCRIPTION OF THE INVENTION

Figure 1:
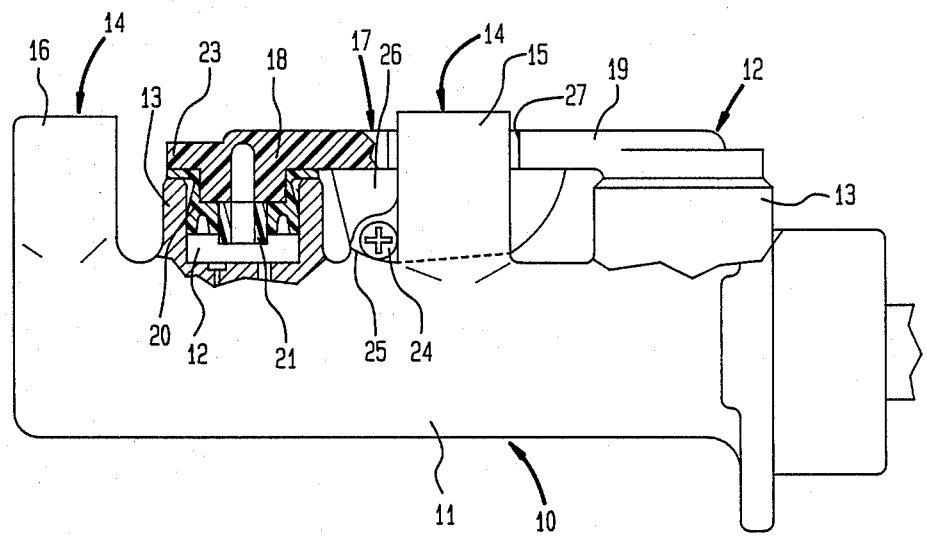
FIG. 1 is a partial cross-sectional view of a brake master cylinder and an inlet member in accordance with one embodiment of the present invention.
Figure 2:
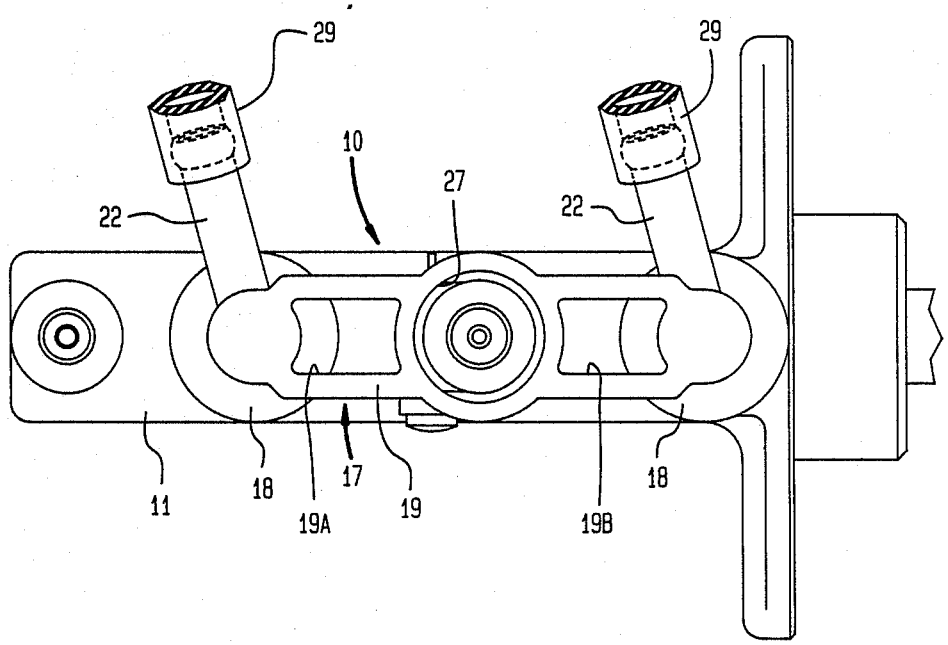
FIG. 2 is a plane view of FIG. 1.

Referring now to the drawings and more particularly to FIG. 1 and FIG. 2 thereof, a tandem brake master cylinder 10 of the present invention comprises a cylinder body 11 which has two boss portions 13 in a top portion of the cylinder body 11 and an inlet 12 formed in each boss portion 13 for supplying brake fluid to each pressure chamber in the cylinder body 11. The cylinder body 11 has two further boss portions 15, 16 in a top portion of the cylinder body and an outlet 14 formed in each boss portion 15, 16 for supplying brake fluid from each pressure chamber to each brake pressure pipe. An inlet assembly 17 is comprised of two first members 18. Each first member 18 is integrally formed of a first tubular portion 21 hermetically fitted into the inlet 12 through a seal member 20 made of rubber material and a second tubular portion 22 connected to the first tubular portion 21 by molded nylon. Each second tubular portion 22 is hermetically fitted into a connecting hose 29 which is, in turn, connected with a reservoir (not shown). Each first member 18 has a large diameter portion 23 at each upper end portion of the first tubular portion 21.

The inlet assembly 17 includes one second member 19 which is integrally formed with each first member 18 at the large diameter portion 23 thereof by molded nylon. The second member 19 has an opening portion 27 which is loosely fitted by the boss portion 15 and has elongated holes 19a, 19b. Due to the arrangement of the opening portion 27 and the elongated holes 19a, 19b, in the molded inlet assembly 17, cooling of each part of the second member 19 may be unified so as to prevent shrinkage from occurring in the second member 19. The second member 19 is integrally provided with a mounting portion 26 approximately centrally of the member which is connectable to a projection portion 25 of the cylinder body 11 by a stepped screw 24 which prevents the mounting portion 26 from being excessively tightened. The projection portion 25 is formed at a bottom region of the boss portion 15 of the cylinder body 11.

As discussed above, since the first members 18 and the second member 19 are integrally formed, the restraining or preventing of revolution of the first member with respect to the cylinder body 11 is such that one first member restrains or prevents the revolution of the other first member by the installation of the inlet assembly 17 on the inlet 12. Restraining or preventing movement in an upward or downward direction of the first member 18 with respect to the inlet 12 is achieved by the same arrangement.

The brake master cylinder has a cylinder body provided with at least two inlets and one outlet positioned between the two inlets on the same side of the cylinder due to the position of the brake pressure pipe on the vehicle and the amount of space for the arrangement. Due to this arrangement, it is possible to easily install the inlet assembly on the inlets of the cylinder body so that the second member may be provided with the opening portion loosely fitted by the boss portion surrounding the outlet.

A proposed solution to the present problem is that the second member is formed so as to avoid the outlet. However, in other proposed arrangements, venting of the air in the brake fluid is such that close contact between the first tubular portion and the seal member does not permit equal pressure. As a result, there may be a leakage of brake fluid from the inlets. In the present invention, the second member is provided with the opening portion which is loosely fitted by the boss portion surrounding the outlet. Accordingly, the close contact between the first tubular portion 21 and the seal member 20 is maintained and there is no leakage of brake fluid from the inlets.

Figure 3:
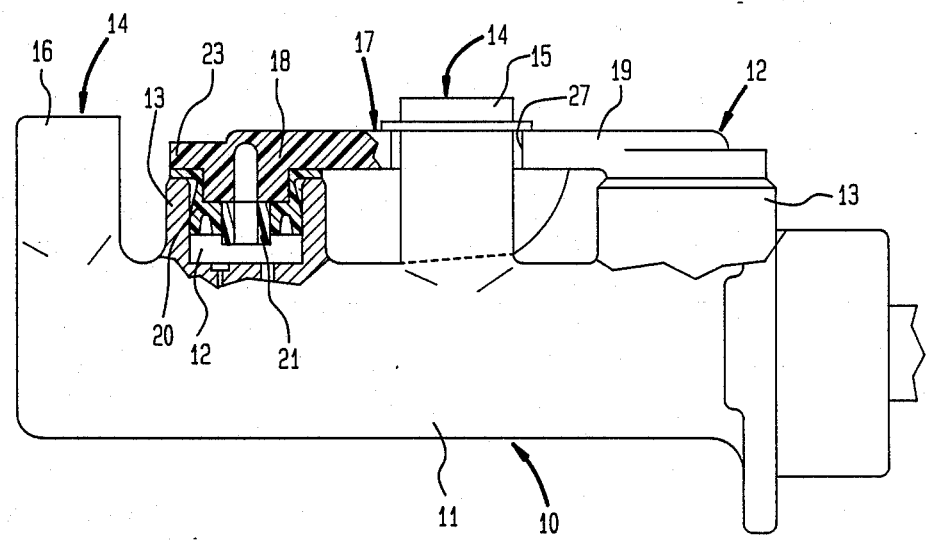
FIG. 3 is a partial cross-sectional view of a brake master cylinder and an inlet member in accordance with a second embodiment of the present invention.
Figure 4:
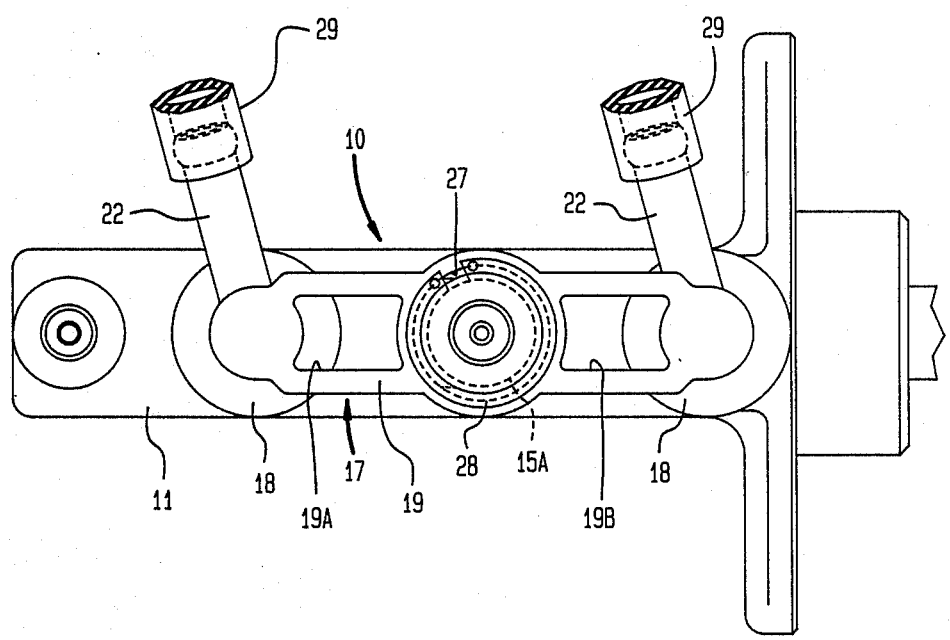
FIG. 4 is a plane view of FIG. 3.

In the second embodiment of the present invention shown in FIG. 3 and FIG. 4, the boss portion 15 surrounding the outlet 14 is projected from an upper surface of the second member 19, and the projection of boss portion is provided with a circular groove 15a at an outer surface thereof. The groove 15a is fitted by a snap ring 28 for positioning the inlet assembly 17 on the cylinder body 11.

Obviously, numerous modifications and variations of the invention are possible in light of the above teachings. It is therefore to be understood that within the scope of the appended claims, the invention may be practiced otherwise than as specifically described herein.

What is claimed is:

1. A brake master cylinder having a reservoir, comprising:

a cylinder body having at least two inlet portions and one outlet portion positioned between said inlet portions at the same side of the body, said cylinder body having boss portions extending therefrom and surrounding said inlet and outlet portions respectively;

an inlet member mounted on said inlet portion of said cylinder body, said inlet member having two first members and one second member, each of said first members being formed of a first tubular portion hermetically fitted into said inlet portion and a second tubular portion connected to said first tubular portion, said second member having an opening portion fitted by said boss portion of said outlet portion of said cylinder body, said boss portion of said outlet portion of said cylinder body being loosely fitted in said opening portion of said second member, said second member being a substantially straight line continuation of said first members when viewed from the side and being substantially symmetrically disposed with respect to the axial center of the cylinder body;

a respective hose member hermetically connected to said second tubular portion of each said first member and being in communication with said reservoir; and means for positioning said inlet member on said cylinder body by means of said second member.

2. A brake master cylinder according to claim 1, wherein said second member having a mounting portion for mounting said inlet member on said cylinder body, said mounting portion of said second member being projected toward said cylinder body at a substantially central location of said second member, said mounting portion being fixed to a projection portion formed on a bottom portion of said boss portion of said outlet portion by means of a screw for positioning said inlet member on said cylinder body.

3. A brake master cylinder according to claim 1, wherein said boss portion of said outlet portion of said cylinder body is projected from an upper surface of said second member, and said projection of said boss portion is provided with a circular groove on an outer surface thereof, said circular groove being fitted by a snap ring for positioning said inlet member on said cylinder body.

* * * * *